United States Patent
Litovtchenko et al.

(10) Patent No.: US 9,665,377 B2
(45) Date of Patent: May 30, 2017

(54) PROCESSING APPARATUS AND METHOD OF SYNCHRONIZING A FIRST PROCESSING UNIT AND A SECOND PROCESSING UNIT

(75) Inventors: Vladimir Litovtchenko, Ebersberg (DE); Harald Luepken, Kirchheim (DE); Markus Regner, Munich (DE)

(73) Assignee: NXP USA, Inc., Austin, TX (US)

( * ) Notice: Subject to any disclaimer, the term of this patent is extended or adjusted under 35 U.S.C. 154(b) by 579 days.

(21) Appl. No.: 14/125,200

(22) PCT Filed: Jul. 20, 2011

(86) PCT No.: PCT/IB2011/053232
§ 371 (c)(1),
(2), (4) Date: Dec. 10, 2013

(87) PCT Pub. No.: WO2013/011353
PCT Pub. Date: Jan. 24, 2013

(65) Prior Publication Data
US 2014/0173247 A1    Jun. 19, 2014

(51) Int. Cl.
*G06F 9/38* (2006.01)
*G06F 11/16* (2006.01)
*G06F 1/12* (2006.01)

(52) U.S. Cl.
CPC .............. *G06F 9/3885* (2013.01); *G06F 1/12* (2013.01); *G06F 11/1658* (2013.01)

(58) Field of Classification Search
CPC .................................................. G06F 11/1658
USPC .......................................................... 714/11
See application file for complete search history.

(56) References Cited

U.S. PATENT DOCUMENTS

| 4,358,823 | A | * | 11/1982 | McDonald | .......... | G06F 11/1641 714/11 |
| 5,758,058 | A | | 5/1998 | Milburn | | |
| 5,838,894 | A | * | 11/1998 | Horst | ............... | G01R 31/31727 709/239 |
| 6,311,289 | B1 | * | 10/2001 | Holmberg | .......... | G06F 11/1658 700/2 |

(Continued)

FOREIGN PATENT DOCUMENTS

| CN | 101251816 A | 8/2008 |
| EP | 372580 A2 | 6/1990 |
| WO | 2009138819 A1 | 11/2009 |

OTHER PUBLICATIONS

International Search Report and Written Opinion correlating to PCT/IB2011/053232 dated Mar. 13, 2012.

*Primary Examiner* — Andrew Caldwell
*Assistant Examiner* — Michael Metzger (57) ABSTRACT

A processing apparatus, comprising at least a first processing unit and a second processing unit, is proposed. The first processing unit comprises a set of first stateful elements, the second processing unit comprises a set of second stateful elements. A set of synchronization data lines may connect the first stateful elements to the second stateful elements in a pairwise manner. A control unit may control the first processing unit, the second processing unit and the synchronization data lines so as to copy the states of the first stateful elements in parallel via the synchronization data lines to the second stateful elements in response to a synchronization request. A method of synchronizing the processing units is also proposed.

20 Claims, 4 Drawing Sheets

(56) References Cited

U.S. PATENT DOCUMENTS

| | | | |
|---|---|---|---|
| 6,694,449 B2 * | 2/2004 | Ghameshlu | G06F 11/1633 |
| | | | 714/11 |
| 7,085,959 B2 * | 8/2006 | Safford | G06F 11/1641 |
| | | | 714/11 |
| 7,328,371 B1 * | 2/2008 | Kalyanasundharam | ................... |
| | | | G06F 11/1641 |
| | | | 712/22 |
| 7,519,856 B2 | 4/2009 | Mizutani | |
| 7,859,542 B1 | 12/2010 | Williams et al. | |
| 2004/0093435 A1 | 5/2004 | Purho | |
| 2005/0034017 A1 | 2/2005 | Airaud et al. | |
| 2007/0174687 A1 | 7/2007 | Graham et al. | |
| 2011/0035750 A1 | 2/2011 | Bogenberger et al. | |
| 2011/0148890 A1 | 6/2011 | Kaburlasos et al. | |
| 2012/0030504 A1 | 2/2012 | Nishiyama et al. | |

* cited by examiner

PROCESSING APPARATUS AND METHOD OF SYNCHRONIZING A FIRST PROCESSING UNIT AND A SECOND PROCESSING UNIT

FIELD OF THE INVENTION

This invention relates to a processing apparatus and to a method of synchronizing a first processing unit and a second processing unit.

BACKGROUND OF THE INVENTION

Multicore processing devices are well established on the market and tend to become ever more common with the ongoing advances in semiconductor device fabrication. A multicore processing apparatus is a device which comprises two or more independent processors, referred to as cores or processing cores. A processor is a unit which reads and executes program instructions. Each core of a multicore apparatus may execute a program independently from the other cores of the multicore apparatus. Multicore devices may thus be used to perform more than one task at the same time.

For instance, a dual core processing device may execute two programs simultaneously, thus achieving a higher speed as compared to a single core running the two programs in a sequential manner. Such operating mode is also referred to as a decoupled parallel mode (DPM).

Alternatively, the two cores may be operated in a redundant manner, i.e., the same input data and program instructions are fed to both cores to generate redundant results. Such operating mode may be referred to as a redundant mode. Any deviation between the output of the first core and the output of the second core may point to a processing fault. An appropriate action may be triggered in response to any disagreement between the output from the first core and the output from the second core. For instance, such results may be discarded or the relevant computation may be repeated. Data processing can thus be made more reliable. It is also known to use an odd number of cores, e.g. three cores, and to accept an output value as valid if the value has been obtained by a majority of the cores.

Thus, a decoupled parallel mode (DPM) is an operating mode in which two or more cores independently execute different tasks. A redundant mode is an operating mode in which two or more cores execute the same task in a redundant manner. In many existing systems, switching between these two modes is possible by restarting (resetting) the system.

These concepts are not restricted to processing cores, but may be generalized to any kind of processing unit. A processing unit is a device for performing logical operations. A processing core is an example of a processing unit. An arithmetic logic unit is another example of a processing unit. A storage unit (memory) as such is not a processing unit. However, a processing unit may comprise one or more memories, in addition to logical components. A processing apparatus may comprise two or more processing units which may be operated independently from each other. For example, the processing units may be operated in a decoupled parallel mode or in a redundant mode.

International publication WO2009/138819 A1 (Bogenberger et al.) describes a processing resource apparatus that comprises a reference processing module and a target processing module. States from the reference processing module are copied to the target processing module using a scan chain. The two modules can thus be synchronized.

SUMMARY OF THE INVENTION

The present invention provides a processing apparatus and a method of synchronizing a first processing unit and a second processing unit as described in the accompanying claims.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Figure 1:
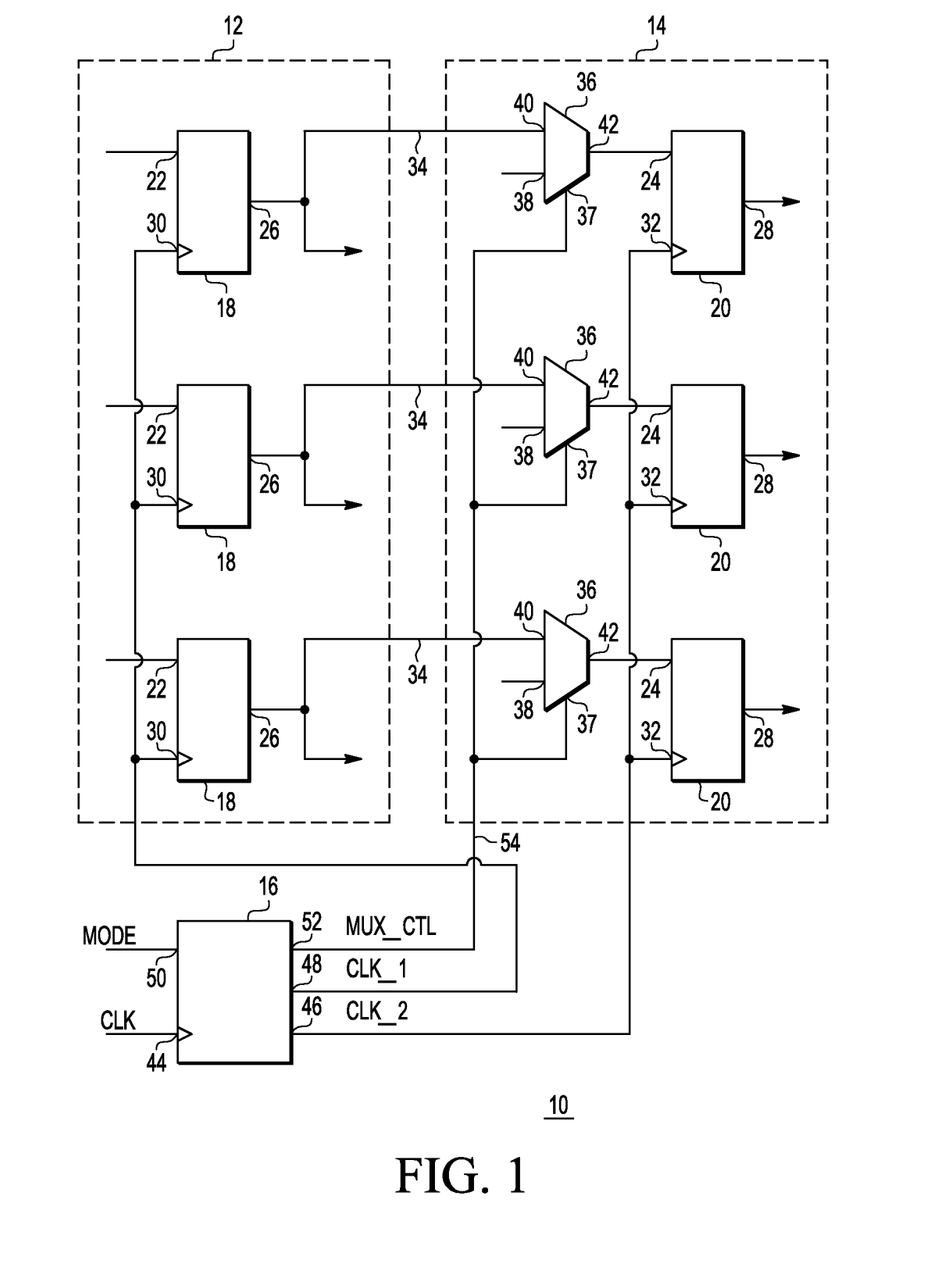
FIG. 1 schematically shows an example of an embodiment of a processing apparatus.

FIG. 1 schematically illustrates a processing apparatus 10. The processing apparatus 10 may comprise, for example, at least a first processing unit 12 and a second processing unit 14, a set of synchronization data lines 34, and a control unit 16. The first processing unit 12 and the second processing unit 14 may, for example, be a first core and a second core, respectively. The first processing unit 12 may be arranged to be clocked by a first clock signal CLK_1. The second processing unit 14 may be arranged to be clocked by a second clock signal CLK_2.

The first processing unit 12 may comprise a set of first stateful elements 18. The second processing unit 14 may comprise a set of second stateful elements 20. The set of synchronization data lines 34 may be operable to connect the first stateful elements 18 to the second stateful elements 20 in a pairwise manner. The control unit 16 may be operable to control the first processing unit 12, the second processing unit 14 and the synchronization data lines 34 so as to copy the states of the first stateful elements 18 in parallel via the synchronization data lines 34 to the second stateful elements 20 in response to a synchronization request.

Each of the synchronization data lines 34 may, for example, comprise a multiplexer 36 having an output 42 connected to an input 24 of one of the second stateful elements 20, a normal data input 38, and a synchronization data input 40 connected to one of the second stateful elements 20. The respective multiplexer 36 may be integrated in the second processing unit 14.

For example, the processing apparatus 10 comprises a first processing unit 12 and a second processing unit 14. The processing apparatus 10 may comprise further processing units (not shown). In the example, the first processing unit 12 comprises a set of first stateful elements 18, while the second processing unit 14 comprises a set of second stateful elements 20.

In the shown example, the set of first stateful elements 18 comprises three stateful elements 18. In practice, it may, of course, comprise a far greater number of stateful elements 18, e.g. thousands or millions of such elements. The stateful elements 18 of the first processing unit 12 may be identical or different elements. For example, some stateful elements 18 might be single bit elements while other stateful elements 18 might be multiple bit elements. The multiple bit elements may each have the same bit size or have different bit sizes. In other words, some or all of the first and second stateful elements 18, 20 may be single bit elements. In addition or alternatively, some or all of the first and second stateful elements 18, 20 may be multiple bit elements.

In the shown example, the stateful elements 18 are data flip-flops (DFF). Each stateful element 18 may have a data input 22 and a data output 26. Each stateful element 18 may be set to a desired state by applying a suitable signal at data input 22. The current state of each stateful element 18 may be read from the respective data output 26. Each stateful element 18 may further comprise a clock input 30.

The data inputs 22 and data outputs 26 of the stateful elements 18 may be suitably interconnected (not shown). For instance, data output 26 of the uppermost stateful element 18 in the figure may be connected to data input 22 of stateful element 18 in the center of the figure, while data output 26 of that latter stateful element 18 may in turn be connected to data input 22 of stateful element 18 near the bottom of the figure. The three shown stateful elements 18 may thus form, for example, a shift register. The data inputs 22 and data outputs 26 of the stateful elements 18 may alternatively be interconnected in any other suitable manner, directly or indirectly. They may, for example, be interconnected via logical circuitry not shown in the figure. For example, some or all of the stateful elements 18 may be interconnected to provide a digital signal processor, an arithmetic logic unit (ALU), or any other kind of structure.

The above statements concerning the first stateful elements 18 apply analogously to the second stateful elements 20 of the second processing unit 14. Each stateful element 20 may notably have a data input 24 and a data output 28. Each stateful element 20 may further have a clock input 32.

Processing apparatus 10 may comprise further components not shown in the figure for the sake of simplicity and clarity. For example, first processing unit 12 may be connected to a first memory, e.g. a first random access memory (RAM). Similarly, second processing unit 14 may be connected to a second memory, e.g. a second random access memory. It is noted that synchronizing these memories may be a trivial task, as both processing units may, for instance, utilize a common memory comprising said first and second memories.

First processing unit 12 and second processing unit 14 may be clocked by a first clock signal CLK_1 and a second clock signal CLK_2, respectively. The first clock signal CLK_1 and the second clock signal CLK_2 may be the same, or they may differ. For instance, the clock rate of one of the two clock signals CLK_1 and CLK_2 may be reduced in order to save energy, while the other clock signal may have a normal clock rate.

The processing apparatus 10 may be operated in a decoupled parallel mode (DPM) in which the first processing unit 12 and the second processing unit 14 may perform different tasks.

The processing apparatus 10 may alternatively be operated in a redundant mode. In the redundant mode, the first processing unit 12 and the second processing unit 14 may independently execute the same instructions, starting from the same initial states and using the same input data. In the redundant mode, it may be beneficial to clock the first processing unit 12 and the second processing unit 14 by the same clock signal, for example, by ensuring that CLK_1 and CLK_2 are identical. For some applications, however, it may be beneficial to feed the processing units with the same input data and with the same instructions but to run them at different clock rates. It may thus be verified whether the system's output critically depends on the clock rate. A redundant mode in which the multiple processing units are clocked by the same clock signal is referred to as a lock-step mode (LSM).

In order to switch from a decoupled parallel mode to a redundant mode, it must be ensured that the processing units have the same initial states. If the redundant mode is a lock-step mode, it must be ensured that the processing units have the same initial states at the same initial clock cycle. In other words, the processing units need to be synchronized prior to operating them in the lock-step mode.

One option for passing from the decoupled parallel mode to a redundant mode can be to restart or to reset the processing apparatus 10. This may be quite a lengthy procedure. Furthermore, it may involve the loss of current data.

Another option may be copying by software. This also tends to be rather slow, as it may require millions of operations.

A third option is to copy the present state of one of the processing units, referred to as a reference processing unit, to the other processing units, referred to as target processing units.

Depending on the specific design or purpose, it may be sufficient to copy not the entire state but instead only the state of a relevant part thereof. By copying state information from the reference processing unit to the one or more target processing units, it may be possible to switch from the decoupled parallel mode to a redundant mode more quickly as compared to reinitializing the reference processing unit and the target processing units. An example design for rapid state transfer from a reference processing unit to one or more target processing units is described below.

Referring back to FIG. 1, the first processing unit 12 may serve as a reference processing unit, while the second processing unit 14 may serve as a target processing unit. The processing apparatus 10 may further comprise a set of synchronization data lines 34. Each synchronization data line 34 may be operable to connect the data output 26 of one of the stateful elements 18 to the data input 24 of a corresponding stateful element 20 of the target processing unit 14. The state of each stateful element 18 may thus be copied to the corresponding stateful element 20 via the respective synchronization data line 34. More specifically, the states of the various stateful elements 18 may be copied in parallel, i.e., simultaneously, to the corresponding stateful element 20.

In the shown example, each synchronization data line 34 may comprise a multiplexer 36. Each multiplexer 36 may have a normal data input 38, a synchronization data input 40, and a multiplexer output 42. Each multiplexer output 42 may be connected to data input 24 of the respective stateful element 20. Each normal data input 38 may be connected, directly or indirectly, to one of the data outputs 28 of the stateful elements 20 and/or to another node within the second processing unit 14. Thus, when the multiplexers 36 connect each normal data input 38 to the respective data input 24, the stateful elements 20 may be interconnected to form a logic that is analogous to the logic provided by the first stateful elements 18 of the first processing unit 12. Furthermore, each synchronization data input 40 may be connected to data output 26 of the corresponding stateful element 18 of the first processing unit 12. When a multiplexer output 42 a given multiplexer 36 is connected to the synchronization data input 40 of that multiplexer 36, the data output 26 of the corresponding stateful element 18 may thus be connected to the data input 24 of the corresponding second stateful element 20. A synchronization connection between the respective first stateful element 18 and the corresponding second stateful element 20 may thus be established.

Processing apparatus 10 may further comprise a control unit 16. In the shown example, the control unit 16 may comprise a clock input 44, a first clock output 48, and a second clock output 46. Control unit 16 may be operable to generate the above-mentioned first clock signal CLK_1 and second clock signal CLK_2 on the basis of an input clock signal CLK. In the example, control unit 16 may receive input clock signal CLK via clock input 44 and output the first and second clock signals CLK_1 and CLK_2 via the first and second clock outputs 48 and 46, respectively. The first clock output 48 may be connected to clock inputs 30 of the first stateful elements 18. The second clock output 46 may be connected to the clock inputs 32 of the second stateful elements 20. The first clock signal CLK_1 and the second clock signal CLK_2 may thus be fed to the first processing unit 12 and to the second processing unit 14, respectively.

As shown, the processing apparatus 10 may comprise a multiplexer control bus 54 for feeding a multiplexer control signal MUX_CTL to each of the multiplexers 36. Each of the multiplexers 36 may be arranged to connect its normal data input 38 to its multiplexer output 42 in response to the multiplexer control signal MUX_CTL indicating a normal operating mode, and to connect the synchronization data input 40 to the multiplexer output 42 in response to the multiplexer control signal MUX_CTL indicating a synchronization mode. The control unit 16 may be arranged to control the multiplexer control signal MUX_CTL to indicate the synchronization mode in response to the synchronization request, and to indicate the normal operating mode after completion of the copying.

The normal operating mode may be a data processing mode of the processing apparatus, that is a mode in which the processing units process data, for example independently from each other. The normal operating mode may be established, for example, by connecting the stateful elements of each processing unit among each other in a suitable manner. A synchronization mode may be a mode in which one or more target processing units are being synchronized with respect to a reference processing unit. A synchronization mode is not a normal operating mode. A scan mode may be a test mode in which data may be extracted from one or more processing units via dedicated hardware, or in which data may be written to one or more processing units via the dedicated hardware. The dedicated hardware may, for example, comprise one or more scan chains. A scan mode is neither a normal operating mode nor a synchronization mode.

For example, control unit 16 may further comprise a mode input 50 and multiplexer control output 52. Control unit 16 may be arranged to receive a mode signal via mode input 50 and to output a multiplexer control signal MUX_CTL at the multiplexer control output 52. Multiplexer control output 52 may be connected to multiplexer control outputs 37 of the multiplexer 36 via a multiplexer control bus 54.

The mode signal MODE may, for example, indicate a normal operating mode. A normal operating mode is a mode in which the multiple processing units, e.g., processing unit 12 and processing unit 14, operate normally to process data. The normal operating mode may, for example, be a decoupled parallel mode or a redundant mode. Control unit 16, in response to the mode signal MODE indicating the normal operating mode, may control, by means of multiplexer control signal MUX_CTL, the multiplexers 36 of the target processing unit so as to connect the multiplexer outputs 42, and thus the data inputs 24 of the corresponding second stateful elements 20, to the normal data inputs 38. In the normal operating mode, the data inputs 24 of the second stateful elements 20 may thus be connected to nodes within the second processing unit 14.

The mode signal MODE received at mode input 50 may alternatively indicate, for example, a synchronization mode. A synchronization mode is a mode in which states of a reference processing unit (in the example, the first processing unit 12) are copied to one or more target processing units (in the example, the second processing unit 14).

It is noted that the multiplexer control signal MUX_CTL may also be used as a status signal for indicating the current operating mode. For example, the multiplexer control signal MUX_CTL may indicate the current operating mode to additional units (not shown) of the apparatus 10 or to other apparatuses (not shown).

The control unit 16 may disable the first clock signal CLK_1 and the second clock signal CLK_2 in response to a synchronization request, and enable the first clock signal CLK_1 and the second clock signal CLK_2 after completion of the copying.

Control unit 16, in response to the mode signal MODE indicating the synchronization mode, may control the multiplexers 36, e.g. by means of multiplexer control signal MUX_CTL, so as to connect the multiplexer outputs 42 to the respective synchronization data inputs 40. Control unit 16 may thus connect the data inputs 24 of the second stateful elements 20 to the corresponding data outputs 26 of the first stateful elements 18. The control unit 16 may further issue one or more clock pulses to the second processing unit 14 so as to latch the states of the first stateful elements 18 into the second stateful elements 20. The control unit 16 may notably issue the one or more clock pulses to the second processing unit 14 but not to the first processing unit 12.

Figure 2:
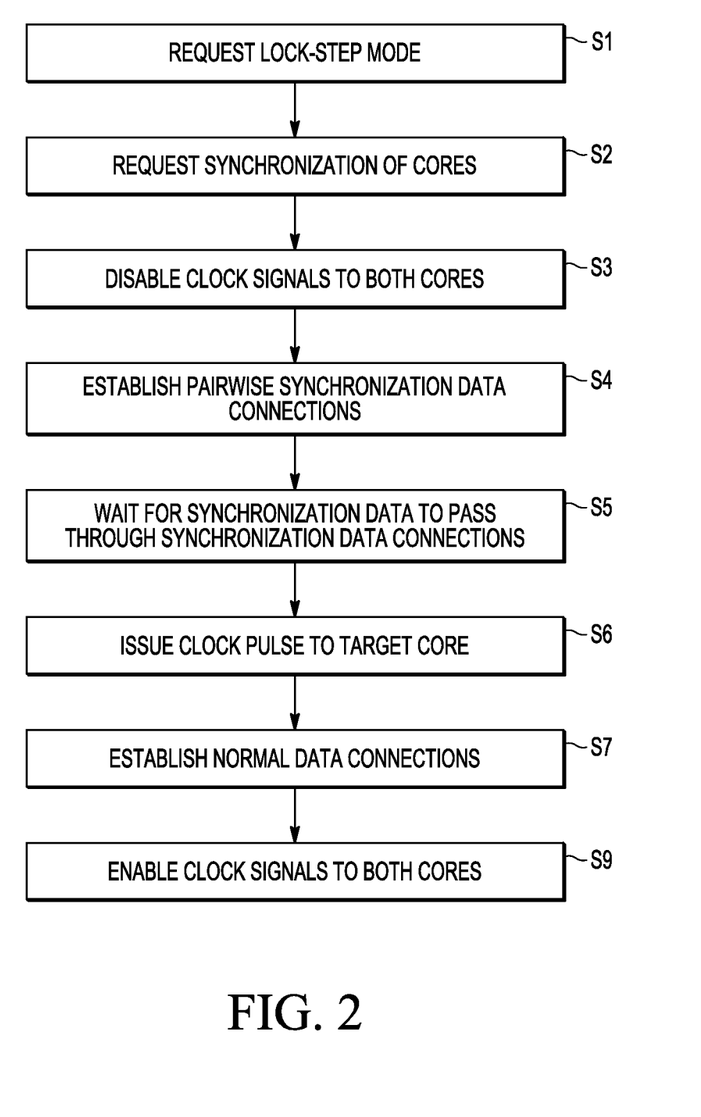
FIG. 2 shows a flow chart of a method of synchronizing a reference processing unit and a target processing unit.

Operation of processing apparatus 10 is further explained with additional reference to FIG. 2.

A requesting unit, for example, the reference processing unit 12 or the target processing unit 14 or some external unit, may issue a request indicating that the processing apparatus 10 should enter a redundant mode, for example, a lock-step mode (block S1).

The processing apparatus 10, in response to the request for entering the redundant mode and upon determining that the processing apparatus 10 is currently not in the redundant mode, may issue a request that the processing units of the processing apparatus (processing units 12 and 14 in the example) be synchronized (block S2).

Processing apparatus 10 may accordingly set the mode signal MODE (see FIG. 1) to indicate the synchronization mode. The control unit 16, in response to the mode signal MODE newly indicating the synchronization mode, may disable the first clock signal CLK_1 and the second clock signal CLK_2 (block S3). The states of the first processing unit 12 and of the second processing unit 14 may thus be "frozen". Their content, and notably the content of the reference processing unit 12, is thus preserved.

The control unit 16 may then proceed to establish the pairwise synchronization data connections from data outputs 26 of stateful elements 18 of the reference processing unit 12 to data inputs 24 of stateful elements 20 of the target processing unit 14. In the example shown in FIG. 1, the pairwise synchronization data connections are established by controlling multiplexers 36 so as to connect the respective synchronization data inputs 40 to the multiplexer outputs 42 (block S4).

The control unit 16, after establishing the synchronization data connections may wait during a short interval, e.g., a predefined interval, to allow the state information that is output at the data outputs 26 of the first stateful elements 18, to propagate from the data outputs 26 to the corresponding data inputs 24 of the second stateful elements 20 (block S5).

The control unit 16 may then issue one or more clock pulses at least to the target processing unit 14, e.g. by controlling the second clock signal CLK_2 accordingly (block S6). The state information applied at data inputs 24 of the second stateful elements 20 may thus be latched into the second stateful elements 20. The number of clock pulses that is sufficient for latching the entire state of a first stateful element 18 to a corresponding second stateful element 20 may depend, firstly, on the bit size of a state and, secondly, on the number of bits that can be transferred per clock cycle via the respective synchronization data line 34. For example, first stateful element 18 and the corresponding second stateful element 20 may each be a register of bit size N, and synchronization data line 34 may be a multiple data line capable of transferring a total of N bits simultaneously, N being a natural number. A single clock pulse will be sufficient for such a layout. First stateful element 18 and second stateful element 20 may notably each be a data flip-flop that is a stateful element of bit size 1, while synchronization data line may be a simple (that is, not multiple) data line.

The states thus having been copied from the first stateful elements 18 to the second stateful elements 20, the control unit 16 may then re-establish the normal data connections (block S7). In the shown example, the normal data connection may be established by controlling the multiplexers 36 so as to connect the normal data inputs 38 to the respective multiplexer outputs 42.

The normal data connections having been re-established, the control unit 16 may re-enable the clock signals CLK_1 and CLK_2 to the reference processing unit 12 and the target processing unit 14, respectively (block S8). If the requested redundant mode is a lock-step mode, the control unit 16 may generate the first clock signal CLK_1 and the second clock signal CLK_2 such that the clock rates are identical. The control unit 16 may, for example, feed the same clock signal to reference processing unit 12 and to the target processing unit 14 (in this case CLK_1 and CLK_2 may be equal). The transition from the decoupled parallel mode to the redundant mode may thus be complete.

As seen, a first processing unit 12 and a second processing unit 14 of a processing apparatus 10 may be synchronized by connecting the first stateful elements 18 to the second stateful elements 20 in a pairwise manner and copying the states of the first stateful elements 18 in parallel to the second stateful elements 20. The technique may notably comprise: clocking the first processing unit 12 and the second processing unit 14 by a first clock signal CLK_1 and a second clock signal CLK_2, respectively; disabling the first clock signal CLK_1 and the second clock signal CLK_2 prior to the connecting; issuing a clock pulse to the second stateful elements 20; and enabling the first clock signal CLK_1 and the second clock signal CLK_2.

Figure 3:
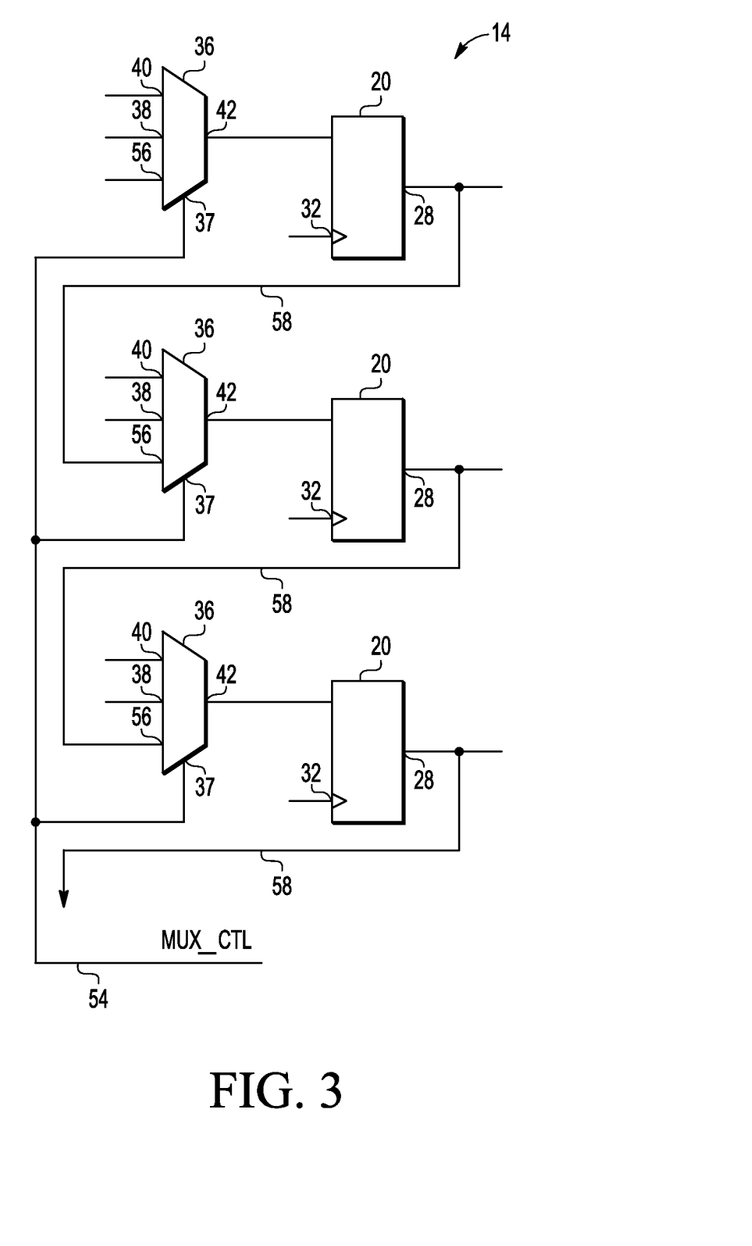
FIG. 3 schematically shows an example of an embodiment of a scan chain.

Turning now to FIG. 3, the processing apparatus 10 may comprise a scan chain 58, 20. The scan chain may comprise at least some of the second stateful elements 20. The scan chain may further comprise at least some of the multiplexers 36. Each of the multiplexers 36 of the scan chain, except possibly a first one of these multiplexers 36, may have a scan data input 56 connected to an output 28 of a preceding stateful element 20 of the scan chain 58. It is noted that the first member of the scan chain does not necessarily have a preceding member; therefore the first one of these multiplexers may be arranged differently. Alternatively, the scan chain may be arranged as a daisy chain, for example. The scan chain 58 may be part of a design-for-test (DFT) circuitry. The DFT circuitry may, for example, be operated using a JTAG protocol. Thus, the DFT circuitry may be adapted for parallel data transfer from the first processing unit 12 to the second processing unit 14.

For example, the target processing unit 14 described above in reference to FIGS. 1 and 2 may comprise a scan chain for extracting data from or writing data to the stateful elements 20. The scan chain may be implemented in a particularly convenient manner by adapting the multiplexers 36 described above in reference to FIGS. 1 and 2. In the present example, each multiplexer 36 may comprise a scan data input 56. Each scan data input 56 may be connected via a scan data line 58 to the data output 28 of one of the other stateful elements 20. The control unit 16 described above in reference to FIGS. 1 and 2 may, in response to the mode signal MODE indicating a scan mode, control the multiplexers 36 so as to connect the scan data inputs 56 to the respective multiplexer outputs 42. The scan chain may thus be established. Each segment of the scan chain may thus comprise, in this order, a multiplexer 36, a subsequent stateful element 20, and a subsequent scan data line 58. A different layout may be adopted notably for the first and/or last segment of the scan chain.

Figure 4:
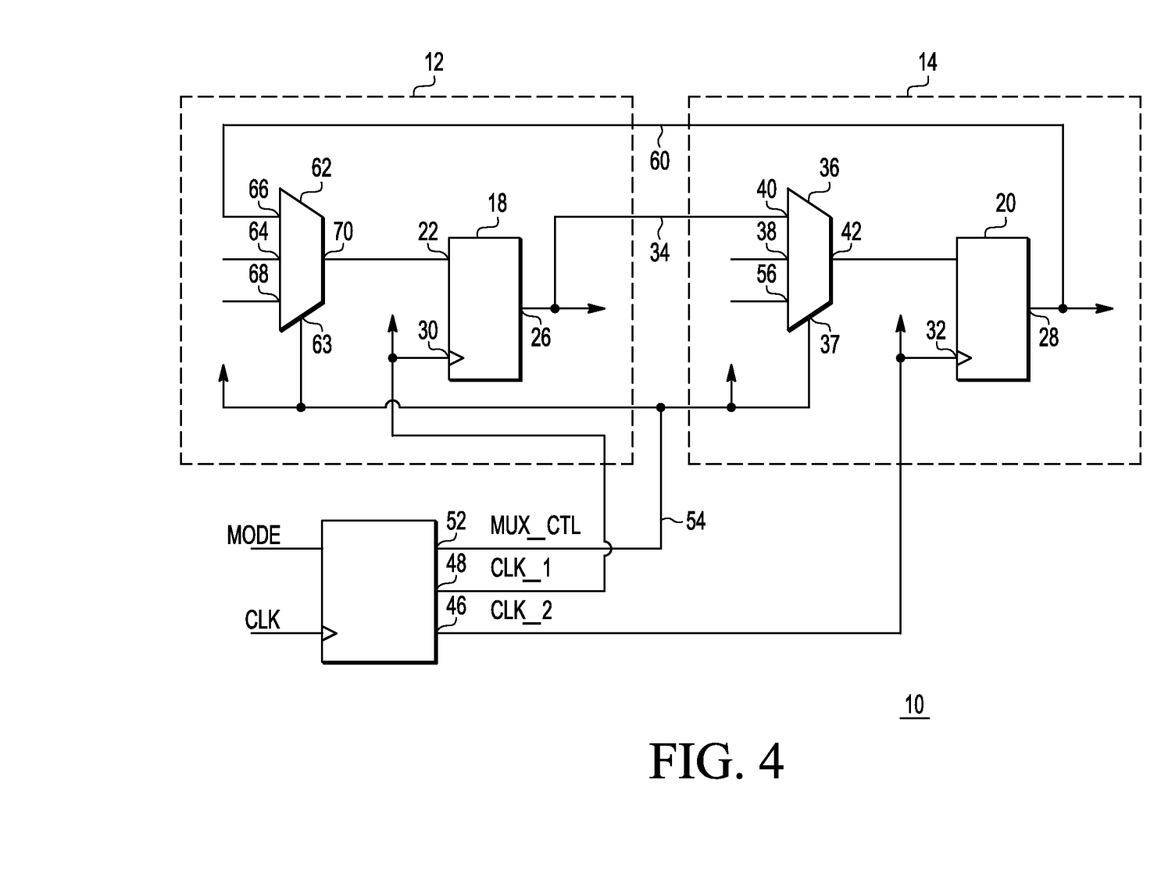
FIG. 4 schematically shows an example of an embodiment of a processing apparatus.

FIG. 4 schematically represents an example of another processing apparatus 10 as described above in reference to FIGS. 1, 2, and 3. The processing apparatus 10 may comprise a set of reverse synchronization data lines 60. The reverse synchronization data lines 60 may be operable to connect the second stateful elements 20 to the first stateful elements 18 in a pairwise manner. The control unit 16 may be operable to control the first processing unit 12, the second processing unit 14 and the reverse synchronization data lines 60 so as to copy the states of the second stateful elements 20 in parallel via the reverse synchronization data lines 60 to the first stateful elements 18 in response to a reverse synchronization request.

The shown apparatus 10 may, for example, have a layout that is symmetrical in regard to the first processing unit 12 and the second processing unit 14. For the sake of simplicity and clarity, only one stateful element 18 of the first processing unit 12 and only one second stateful element 20 of the second processing unit 14 are shown in this figure. Each processing unit may, of course, comprise a large number of stateful elements as schematically illustrated in FIGS. 1 and 3. The first processing unit 12 may notably comprise a scan chain comprising the first stateful elements 18. The second processing unit 14 may comprise a second scan chain comprising the second stateful elements 20. The first scan chain and the second scan chain may be arranged as described above by way of example in reference to FIG. 3. The first scan chain and the second scan chain may also be arranged as described in the above-mentioned international publication WO 2009/138819 A1 (Bogenberger et al.). Both the first scan chain and the second scan chain may notably form a daisy chain.

The first processing unit 12 may notably comprise a set of reverse synchronization data lines 60 and a set of multiplexers 62. Reverse synchronization data lines 60 may connect data outputs 28 to synchronization data inputs 66 in a pairwise manner. Reverse synchronization data line 60 may thus be analogous to (forward) synchronization data lines 34. Each multiplexer 62 may have a normal data input 64, a synchronization data input 66, a scan data input 68, a multiplexer output 70, and a multiplexer control input 63. These inputs 63, 64, 66, and 68 and the multiplexer output 70 may be analogous to the corresponding inputs and output of multiplexer 36 described above in reference to FIGS. 1, 2, and 3. Multiplexer output 70 may be connected to data input 22. Multiplexer control bus 54 may connect multiplexer control output 52 to both multiplexer control input 37 and multiplexer control input 63. Processing apparatus 10 may thus be operated to synchronize second processing unit 14 with first processing unit 12 as described above in reference to FIGS. 1, 2, and 3 (forward synchronization) and, alternatively, to synchronize first processing unit 12 with second processing unit 14 (reverse synchronization). Processing apparatus 10 may further be operable to swap the states of first processing unit 12 and second processing unit 14.

To conclude, a flexible solution is proposed which may allow a processing apparatus to switch dynamically from an asynchronous to a synchronous mode of operation, and vice versa. No initialization and/or wait time may be required, as the processing units may be synchronized as fast as in only a few clock cycles. Depending on the design, synchronization in only one clock cycle may be possible. A device reset may not be necessary. Known scan chain arrangements may be adapted, thus avoiding or minimizing the need for additional dedicated components. The device availability time may be significantly increased while safety features may remain intact. It may possible to resolve peak processing loads more rapidly and more easily by switching from a lock step mode to a decoupled parallel mode. The design also lends itself to the introduction of further self-test features, such as error injection.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

In the context of data transfer, two nodes are said to be connected if data may be propagate from one of the nodes to the other node. In the context of charge transfer (electrical current), two nodes are said to be connected if charge may propagate from one of the nodes to the other node.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, two or more first stateful elements 18 may be combined in one stateful element. Similarly, two or more second stateful elements 20 may be combined in one stateful element.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, processing units 12 and 14 and control unit 16 may be located on a single integrated circuit or within a same device. Alternatively, the examples may be implemented as any number of separate integrated circuits or separate devices interconnected with each other in a suitable manner. For example, processing units 12 and 14 and control unit 16 may be implemented as three separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A processing apparatus, comprising:
at least a first processing unit;
a second processing unit;
a set of synchronization data lines; and
a control unit;
said first processing unit comprising a set of first stateful elements;
said second processing unit comprising a set of second stateful elements;
said set of synchronization data lines being operable to connect said first stateful elements to said second stateful elements in a pairwise manner;
said control unit being operable to control said first processing unit, said second processing unit and said synchronization data lines so as to copy states of said first stateful elements in parallel via said synchronization data lines to said second stateful elements in response to a synchronization request.

2. The processing apparatus of claim 1, each of said synchronization data lines comprising a multiplexer having:
an output connected to an input of one of said second stateful elements;
a normal data input; and
a synchronization data input connected to one of said second stateful elements.

3. The processing apparatus of claim 2, said multiplexer being integrated in said second processing unit.

4. The processing apparatus of claim 2, comprising a multiplexer control bus for feeding a multiplexer control signal to each of said multiplexers.

5. The processing apparatus of claim 4, each of said multiplexers being arranged to connect said normal data input to said multiplexer output in response to said multiplexer control signal indicating a normal operating mode, and to connect said synchronization data input to said multiplexer output in response to said multiplexer control signal indicating a synchronization mode.

6. The processing apparatus of claim 5, said control unit being arranged to control said multiplexer control signal to indicate said synchronization mode in response to said synchronization request, and to indicate said normal operating mode after completion of said copying.

7. The processing apparatus of claim 1, comprising a scan chain, said scan chain comprising a subset of said second stateful elements.

8. The processing apparatus of claim 2, comprising a scan chain, said scan chain comprising a subset of said second stateful elements and a subset of said multiplexers; each of said multiplexers of said scan chain having a scan data input connected to an output of a preceding stateful element of said scan chain.

9. The processing apparatus of claim 1, said first processing unit being arranged to be clocked by a first clock signal, said second processing unit being arranged to be clocked by a second clock signal; said control unit being arranged to disable said first clock signal and said second clock signal in response to said synchronization request, and to enable said first clock signal and said second clock signal after completion of said copying.

10. The processing apparatus of claim 1, said control unit being arranged to issue one or more clock pulses to said second processing unit so as to latch said states of said first stateful elements into said second stateful elements.

11. The processing apparatus of claim 10, said control unit being arranged to issue said one or more clock pulses to said second processing unit but not to said first processing unit.

12. The processing apparatus of claim 1, wherein said first and second stateful elements are single bit elements or multiple bit elements.

13. The processing apparatus of claim 1, comprising a set of reverse synchronization data lines, said reverse synchronization data lines being operable to connect said second stateful elements to said first stateful elements in a pairwise manner; said control unit being operable to control said first processing unit, said second processing unit and said reverse synchronization data lines so as to copy the states of said second stateful elements in parallel via said reverse synchronization data lines to said first stateful elements in response to a reverse synchronization request.

14. The processing apparatus of claim 3, comprising a multiplexer control bus for feeding a multiplexer control signal to each of said multiplexers.

15. The processing apparatus of claim 2, said first processing unit being arranged to be clocked by a first clock signal, said second processing unit being arranged to be clocked by a second clock signal; said control unit being arranged to disable said first clock signal and said second clock signal in response to said synchronization request, and to enable said first clock signal and said second clock signal after completion of said copying.

16. The processing apparatus of claim 2, said control unit being arranged to issue one or more clock pulses to said second processing unit so as to latch said states of said first stateful elements into said second stateful elements.

17. The processing apparatus of claim 9, said control unit being arranged to issue one or more clock pulses to said second processing unit so as to latch said states of said first stateful elements into said second stateful elements.

18. The processing apparatus of claim 7, said control unit being arranged to issue one or more clock pulses to said second processing unit so as to latch said states of said first stateful elements into said second stateful elements.

19. A method of synchronizing a first processing unit and a second processing unit of a processing apparatus, said first processing unit comprising a set of first stateful elements, said second processing unit comprising a set of second stateful elements; said method comprising:
  connecting said first stateful elements to said second stateful elements in a pairwise manner; and
  copying states of said first stateful elements in parallel to said second stateful elements.

20. The method of claim 19, comprising:
  clocking said first processing unit and said second processing unit by a first clock signal and a second clock signal, respectively;
  disabling said first clock signal and said second clock signal prior to said connecting;
  issuing a clock pulse to said second stateful elements; and
  enabling said first clock signal and said second clock signal.

* * * * *